United States Patent [19]

Babel

[11] Patent Number: 4,704,056
[45] Date of Patent: Nov. 3, 1987

[54] TOOL-CLAMPING DEVICE

[75] Inventor: Werner Babel, Pfronten-Meilingen, Fed. Rep. of Germany

[73] Assignee: MAHO Aktiengesellschaft, Pfronten, Fed. Rep. of Germany

[21] Appl. No.: 896,668

[22] Filed: Aug. 14, 1986

[30] Foreign Application Priority Data

Aug. 14, 1985 [DE] Fed. Rep. of Germany ....... 3529181

[51] Int. Cl.$^4$ .............................................. B23C 5/26
[52] U.S. Cl. ................................... 409/233; 408/240
[58] Field of Search ............... 409/230, 231, 232, 233, 409/234; 408/239 R, 239 A, 240

[56] References Cited

U.S. PATENT DOCUMENTS

| | | | |
|---|---|---|---|
| 3,285,101 | 11/1966 | Klingel | 409/232 X |
| 4,443,020 | 4/1984 | Krause | 409/233 X |
| 4,553,886 | 11/1985 | Vasilchenko et al. | 409/233 |

FOREIGN PATENT DOCUMENTS 6646 3/1954 Fed. Rep. of Germany .
554422 7/1943 United Kingdom .

Primary Examiner—Z. R. Bilinsky
Attorney, Agent, or Firm—Lahive & Cockfield

[57] ABSTRACT

The subject of the invention is a device for clamping tools in the spindle of a machine tool, said device comprising a collet chuck located centrally in the spindle with clamping jaws at the forward end, a spring assembly to generate the necessary closing force and a mechanism overcoming the closing force to open the collet chuck. To avoid the supplying of pressure medium to the spindle and to be able to orient the spindle simply to change tools, the mechanism is located laterally next to the spindle in the spindle head and engages the collet chuck externally as well as an outer ring on the spindle. The outer ring has two notches for engagement of two noses for spindle orientation.

10 Claims, 4 Drawing Figures

TOOL-CLAMPING DEVICE

TECHNICAL FIELD

The invention relates to a device for clamping tools in the spindle of a machine tool, consisting of a collet chuck located centrally in the spindle with clamping jaws at the forward end, a spring assembly located in the spindle, and a mechanism which overcomes the force of the spring assembly to open the collet chuck.

Devices are used to clamp tools or their tapered shanks in the spindles of milling machines and drill presses, for example, the individual parts of said devices being built directly into the spindle and turning together with the latter. A so-called collet chuck is located axially displaceable in a central lengthwise bore in the spindle, said chuck bearing gripping claws at its free end to engage the tool-holding fixture. The radially projecting outer surfaces of the gripping claws are beveled and cooperate with tapered surfaces in the spindle. The gripping claws are brought together or spread apart by a lengthwise motion of the collet chuck to hold or release the tool-holding fixture (ISO taper) inserted in the tapered opening in the spindle. A spring assembly is mounted inside the spindle and around the collet chuck to produce the adjusting motion and the relatively high clamping forces required, said assembly acting on a pressure element mounted on the shaft of the collet chuck and exerting a force constantly on the collet chuck, said force acting in the closing direction of the gripping claws. A hydraulic piston-cylinder unit, located in the spindle bore, is mounted on the end of the collet chuck to spread the gripping claws to release the tool, the piston of said unit displacing the collet chuck axially against the force of the spring assembly in the spindle bore when said unit is charged with pressure fluid, thereby spreading the gripping claws which are subject to radial pretensioning. Disadvantages of this type of clamping device include the technically difficult supplying of the pressure fluid to the piston-cylinder unit rotating together with the spindle and carrying said fluid away again; the resultant structural length of the spindle; the stresses on the spindle bearings when the collet chuck is actuated; and finally the need for an additional device for precise spindle orientation and locking at the angle setting required for automatic tool changing.

OBJECTS AND SUMMARY OF THE INVENTION

The goal of the invention is to provide a clamping device for tools, which does not exhibit the abovementioned disadvantages of known designs and which allows simplification of the overall spindle design.

This goal is achieved according to the invention by locating the mechanism for spreading the gripping claws, and thus releasing the tool, near the spindle in the spindle head, said mechanism engaging a part of the pressure element projecting out of the spindle as well as engaging the spindle.

The invention ensures that the pressure fluid no longer needs to be supplied to the piston-cylinder unit as it turns, so that sealing problems can no longer occur in practice. The common engagement with the pressure element and the spindle produces a closed power system during tool changing with no axial load on the spindle bearings, which can therefore be made simpler in design or smaller in size. Since the mechanism is mounted outside the spindle in a favorable location in the spindle head, it can fulfill the function of precise spindle orientation for automatic tool changing as well as producing the spreading movement of the gripping claws, for which purpose a special device of costly design was formerly required.

Advantageous embodiments of the invention are the subjects of subclaims.

BRIEF DESCRIPTION OF THE DRAWINGS

The following is a detailed description of one embodiment of the invention with reference to the drawing, wherein.

DETAILED DESCRIPTION OF PREFERRED EMBODIMENT

Figure 1:
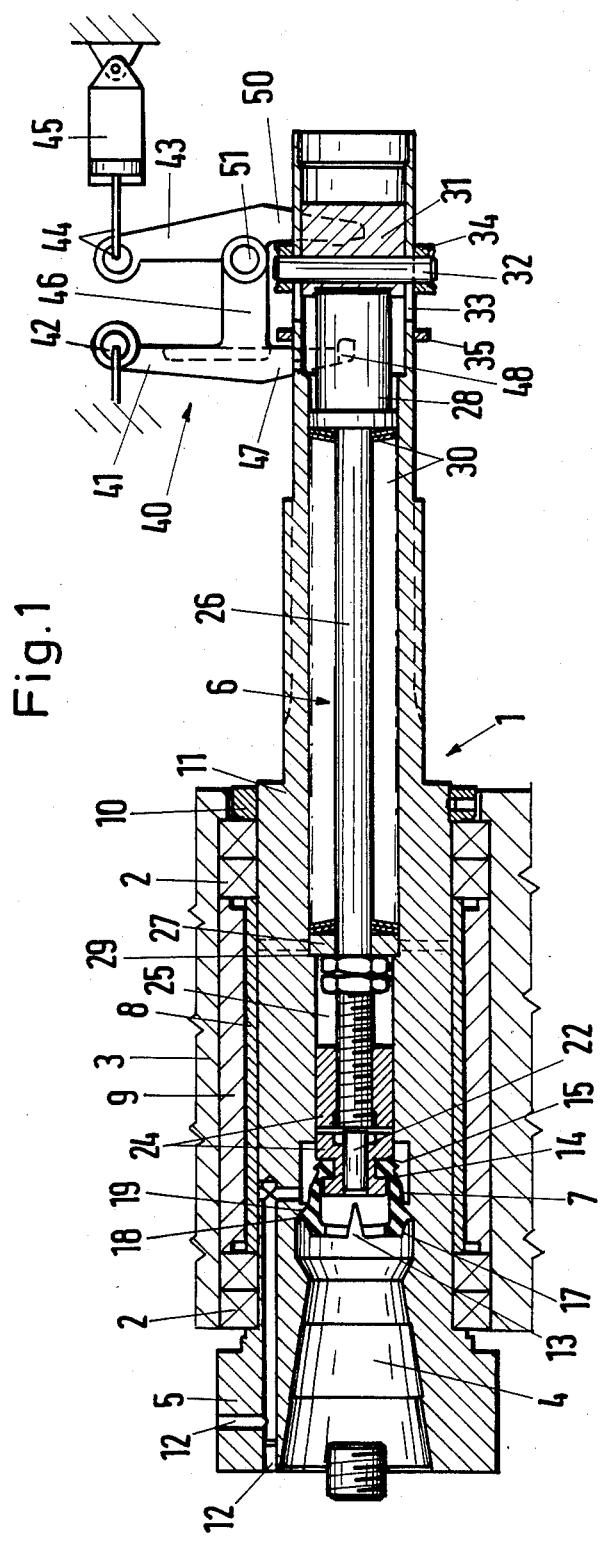
FIG. 1 shows an axial section through a spindle.

Spindle 1 shown in FIG. 1 is mounted in bearings 2 in a spindle head 3 and driven by a motor, not shown. A tool is inserted into a tapered recess 4 in a projecting spindle nose 5 and secured by means of a collet chuck 6 whose gripping claws 7 grip the tightening nut of the tool-holding fixture. An outer spacing bushing 9 and an inner sleeve 8 are located between the two pairs of bearings 2 and surround spindle 6 at its thickened central part. The bearing structure is protected by a ring 10 screwed onto the end of thickened central part 11 of spindle 1. Channels 12 are provided in spindle nose 5 and lead from the outside into the receiving area 13 of gripping claws 7.

Collect check 6 is mounted lengthwise-displaceably in a central lengthwise bore 25 in spindle 1. Gripping claws 7 of collet chuck 6 have their spherical rear ends 14 pivotably mounted in a groove 15 of a multi-part head piece. Gripping claws 7 have beveled outer surfaces 17 at their forward parts which cooperate in the position shown with an annular bead 19 on the circumferential surface of receiving area 13 to create the opening or closing movements of gripping claws 7 when collet chuck 6 is displaced lengthwise. Cylindrical gripper head 24 is guided in a central lengthwise bore 25 of spindle 1 and mounted on the forward end 22 of a shaft 26. Shaft 26 extends in the spindle axis through the bore of a pressure disk 27 and is permanently connected by its rear end to a cylindrical guide element 28. A cup spring assembly 30 is located between pressure disk 27 which abuts an annular shoulder 29 in lengthwise bore 25, and guide element 28, said assembly creating the force to close collet chuck 6. Guide element 28 is fastened by its rear end to a cylindrical pressure element 31 located with limited lengthwise displaceability and non-rotatably in the rear hollow end part of spindle 1. A pin 32 seated radially in pressure element 31 penetrates with each of its ends an elongated hole 33 aligned lengthwise in spindle 1 and serves to fasten and guide a pressure ring 34 slide-mounted on spindle 1. An outer ring 35 is mounted externally on spindle 1, immediately in front of the two elongated holes 33 located diametrically opposite. The device for opening collet chuck 6 and for precise locking of spindle 1 in the suitable angle setting for changing tools receives a pair of tongs 40 located transversely to the spindle, said tongs 40 being suspended by one of their actuating levers 41 laterally next to spindle 1 in spindle head 3 by a joint 42. The rod 44 of a piston-cylinder unit 45 engages the end of the other actuating lever 43, the cylinder of said unit being articulated in spindle head 3. First actuating lever 41 is made integral with a central projection 46 and an arm 47 which surrounds spindle 1 externally at a distance and has precision-machined noses 48 at both ends. These noses 48 each engage an end cutout 49 in outer ring 35 with their lateral beveled surfaces to precisely align the stopped and prealigned spindle 1 immediately before each tool change and to prevent it from rotating during the tool change.

The part of the tongs formed by second actuating lever 43 and a pressure arm 50 surrounding spindle 1 is pivotably connected by a joint 51 at the end of central projection 46 with first tongs part 41, 47. Noses 52 are formed at both ends of pressure arm 50, the spherical surfaces of said noses abutting the rear end surface of pressure ring 34 when collet chuck 6 is actuated.

The function of the device designed according to the invention is described below with reference to FIGS. 2a–c.

Figure 2A:
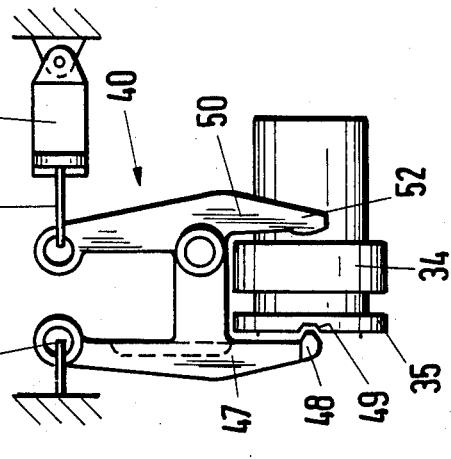
FIGS. 2a–c shows various actuating positions of the device subject of the invention.
Figure 2B:
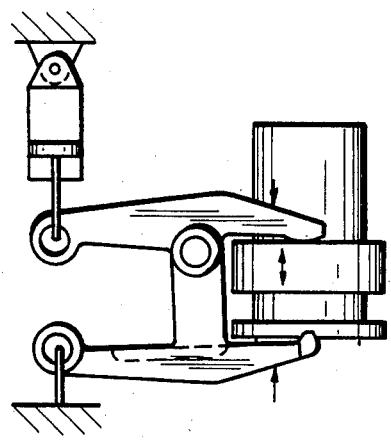
Figure 2C:
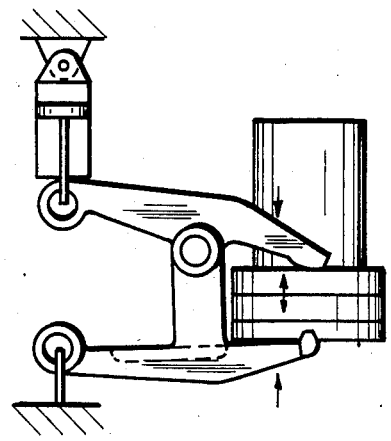

In the basic position shown in FIG. 2a collet chuck 6 is held in its closed position by the action of cup spring assembly 30, with a tool clamped in tapered recess 4 in spindle nose 5. As can be seen, tongs 40 are open and noses 48 are disengaged from diametrally opposite openings 49, so that spindle 1 can rotate. To add or remove, i.e. to change a tool, spindle 1 is brought at low speed to a fixed angle setting close to the established changing position in which the two openings 49 in outer ring 35 are opposite noses 48 (see FIG. 2a). Charging piston-cylinder unit 45 with a pressure medium results in an intermediate position as shown in FIG. 2b, in which noses 52 abut the two ends of arm 50 at pressure ring 34 and noses 48 engage openings 49. This engagement may result in a slight twisting motion of the spindle and in its precise location at the changing position. When piston-cylinder unit 45 is charged again, the two arms 47 and 50 of tongs 40 move pressure ring 34 and outer ring 35 mounted on spindle 1 toward one another until they touch as shown in FIG. 2c, made possible by the suspended articulation of tongs 40 in the spindle head. This motion occurs with overcoming of the force of cup spring assembly 30 and results in a relative lengthwise displacement of collet chuck 6 in spindle 1. The lengthwise displacement is converted to a radial swiveling movement of clamping jaws 7, after which the tool can be removed manually or automatically and replaced by another. After the new tool is inserted piston-cylinder unit 45 is released and collet chuck 6 assumes the basic position shown in FIGS. 1 and 2a under the influence of cup spring assembly 30.

The invention is not limited to the embodiment shown. Thus, tongs 40 can also be used in spindles of other designs, provided the collet chuck is located relatively displaceably axially in the spindle in these designs to release and grip the tool. The important feature is that the supply of pressure fluid to the spindle is avoided by the external application of forces to overcome the tensioning forces of the cup spring assembly, and the spindle can be oriented and locked in the set changing position, made possible by the suspended articulation of tongs 40 among other features.

What is claimed is:

1. Device for clamping a tool in the spindle of a machine tool, such device comprising:
    a collet chuck disposed centrally in the spindle with clamping jaws at the forward end,
    a spring assembly located in the spindle for spring-loading the jaws, and
    release means for overcoming the force of the spring assembly to open the collet chuck, including a pair of tongs having a first arm pivotably articulated to the spindle head and a second arm which engages a piston-cylinder unit, such release means being located movably and laterally next to the spindle and engaging said collet chuck and spindle externally thereof.

2. Device according to claim 1, wherein one of the arms engages an outer ring mounted on the spindle and the other arm engages a pressure element of the collet chuck, so as to exert a thrust thereagainst upon activation of the piston-cylinder unit.

3. Device according to claim 2, wherein the pressure element is mounted on the central shaft of the collet chuck and is guided nonrotatably and axially displaceably in the spindle and includes an external pressure ring for bearing against said other arm.

4. Device according to claim 3, wherein the pressure ring is connected with the pressure element by a cross pin which projects through diametrically opposed elongated holes in the spindle.

5. Device according to claim 4, wherein the spindle includes an arm engaging portion having a centering notch for engaging a nose at the end of an arm of the tongs.

6. Device according to claim 5, wherein the first arm has a central projection extending therefrom to a free end, and wherein the second arm is pivotally mounted to said free end of the projection.

7. Device according to claim 1, wherein the spindle has an outer ring thereon with a centering notch therein, and wherein a said arm includes a nose for engaging said notch.

8. Device according to claim 1, wherein the first arm has a central projection extending therefrom to a free end, and wherein the second arm is pivotally mounted to said free end of the projection.

9. Device according to claim 2, wherein a said arm has a yoke-shaped end located about the spindle.

10. Device according to claim 7, wherein a said arm is nonrotatable, and the alignment of the nose in said notch secures the spindle in a tool-change position.

* * * * *